United States Patent [19]

Emert et al.

[11] E Patent Number: Re. 32,567

[45] Reissued Date of Patent: Dec. 29, 1987

[54] SKI BRAKE

[75] Inventors: Anton Emert, Oberau; Walter Knabel, Murnau; Manfred Richert, Munich, all of Fed. Rep. of Germany

[73] Assignee: Marker International Company, Salt Lake City, Utah

[21] Appl. No.: 765,689

[22] Filed: Aug. 15, 1985

Related U.S. Patent Documents

Reissue of:

[64] Patent No.: 4,515,388
Issued: May 7, 1985
Appl. No.: 407,098
Filed: Aug. 11, 1982

[30] Foreign Application Priority Data

Aug. 12, 1981 [DE] Fed. Rep. of Germany ..... 3131917

[51] Int. Cl.[4] ..... A63C 7/10
[52] U.S. Cl. ..... 280/605
[58] Field of Search ..... 280/605, 604, 620

[56] References Cited

U.S. PATENT DOCUMENTS

| | | | |
|---|---|---|---|
| 4,124,223 | 11/1975 | Kubelka | 280/605 |
| 4,239,256 | 12/1980 | Krob | 280/605 |
| 4,279,432 | 7/1981 | Krob | 280/605 |
| 4,294,458 | 9/1981 | Sedlmayr | 280/605 |
| 4,337,964 | 7/1982 | Biermann | 280/605 |
| 4,355,817 | 10/1952 | Krob | 280/605 |
| 4,463,967 | 8/1984 | Klubitschko | 280/605 |

FOREIGN PATENT DOCUMENTS

| | | | |
|---|---|---|---|
| 2926822 | 1/1980 | Fed. Rep. of Germany | 280/605 |

*Primary Examiner*—David M. Mitchell
*Attorney, Agent, or Firm*—D. Peter Hochberg

[57] ABSTRACT

A pedal-actuated ski brake biased into the braking position and having a means for holding the brake prong inboard of the ski when in the skiing position. The ski brake may also have a means for biasing the brake prong outboard of the ski when in the braking position. When the ski brake is used with a turntable ski binding, the pedal is received inside an opening in the turntable and there is also a means for engaging the heel retainer so as to hinder unwanted movement.

5 Claims, 5 Drawing Figures

FIG. 1
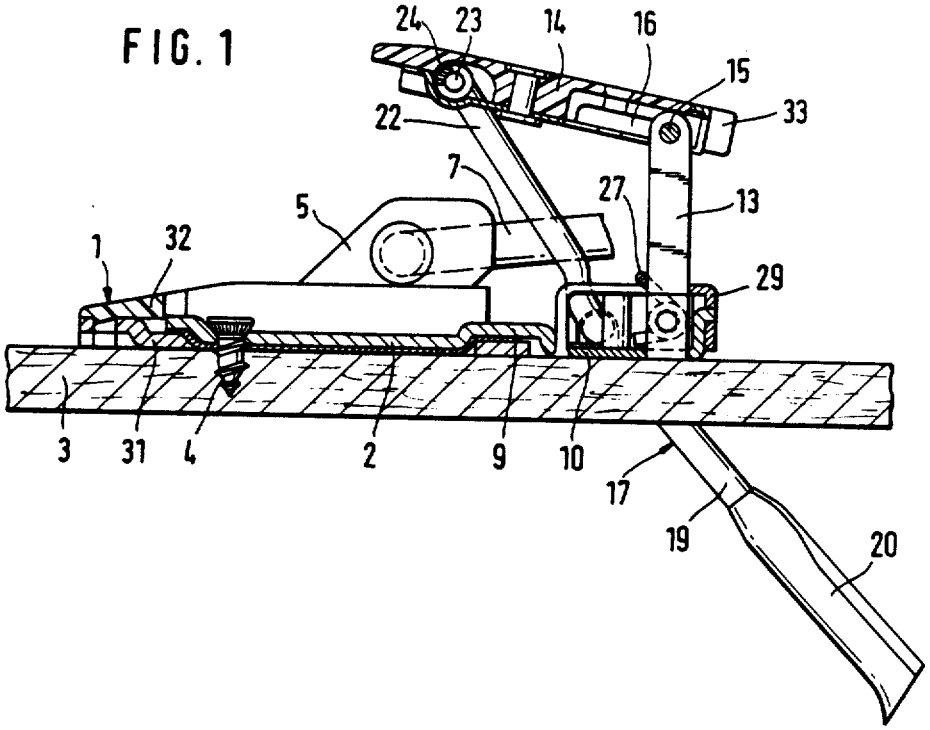
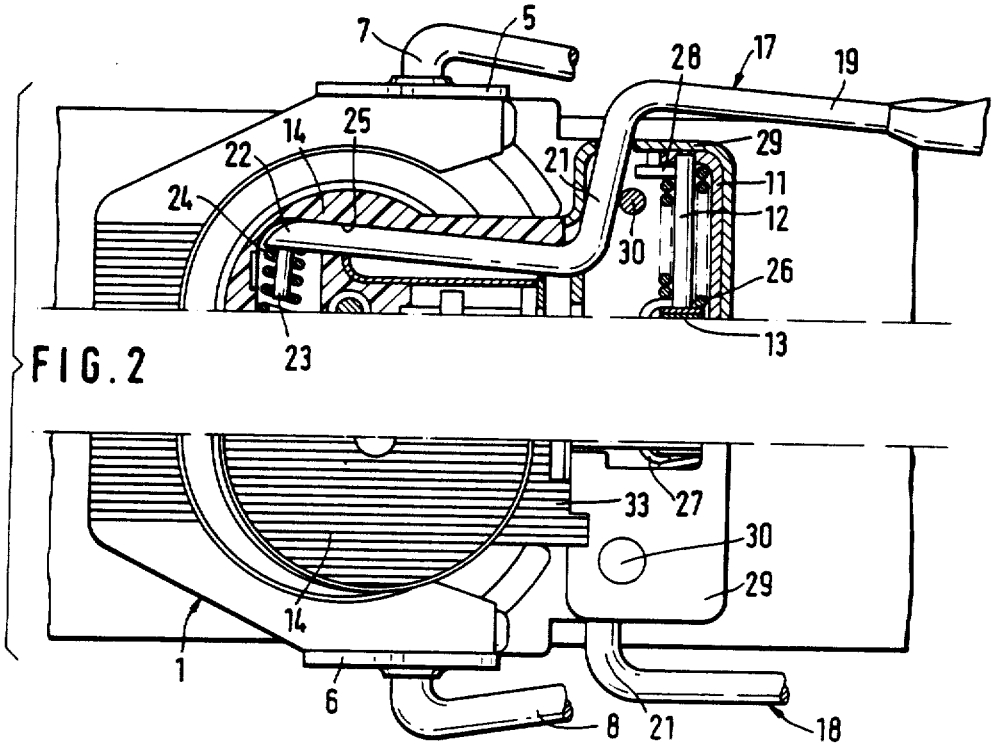
FIG. 2

SKI BRAKE

Matter enclosed in heavy brackets [ ] appears in the original patent but forms no part of this reissue specification; matter printed in italics indicates the additions made by reissue.

The invention herein relates to brakes for skis and particularly to ski brakes used with safety ski bindings.

Attention is invited to pending U.S. patent application Ser. No. 198,133, filed Oct. 21, 1980, now U.S. Pat. No. 4,366,968 for Combination Ski Boot Retainer and Ski Brake; to pending U.S. patent application Ser. No. 358,372 filed Mar. 15, 1982 for Ski Brake; and to pending U.S. patent application Ser. No. 368,276, filed Apr. 14, 1982 for Ski Brake; all of which are assigned to the assignee of this application and all of which involve ski brakes.

Other ski brakes have often used pieces of wire shaped into a lever having a pivot shaft between upper and lower arms. The lower arms form the prongs of the brake and extend below the ski when the braking position is assumed. These lower arms are rotated above the bottom of the ski when the non-braking (that is, skiing) position is assumed. In other ski brakes the brake prongs extend outwardly from the ski even when in the non-braking position. This creates the danger that one of these brake prongs will engage with other objects, such as the brake prongs of another ski, thereby threatening the safety of the skier. Thus, it is highly desirable to minimize this risk by employing a lever that is drawn inboard of the ski when put in the non-braking position.

A very useful ski binding is the so-called turntable ski binding, such as shown in U.S. Pat. No. 4,035,001, wherein the heel of the ski boot is permitted to rotate somewhat in the ski binding. In adapting a ski brake to such a binding, it is desirable to provide a means for limiting the frictional resistance between the ski boot and the ski brake, thereby still allowing the ski boot and the heel retainer of the binding to rotate. It is also desirable to provide a means for selectively inhibiting movement of the ski binding such as when the ski is being transported.

In addition, it is desirable to minimize the height of the sole of the ski boot above the ski.

The invention herein provides a ski brake in which the brake prongs are drawn inboard of the ski when the skiing position is assumed. It also features a pedal and turntable arrangement that permits rotation of a ski boot in a turntable binding. It also provides a means for selectively inhibiting the rotation of the heel retainer in a turntable binding. It further features a construction which minimizes elevation of the ski boot above the ski.

In its preferred embodiments the ski brake according to the invention has two levers mounted on opposite sides of the ski. Each lever has a pivot shaft between a lower arm and an upper arm. Each lever is rotatable between a braking position in which the lower arm extends below the ski and outward from the ski and a non-braking position in which the lower arm does not extend below the ski. An actuating arm is connected to each lever and is movable between an actuating position wherein each lever is in its braking position and non-braking position. A pedal has one portion rotatably attached to the upper arm of each lever and another portion rotatably attached to the actuating arm. The pedal is movable between a skiing position in which each of the levers is put in its non-braking position and a non-skiing position. There is a spring for biasing the actuating arm to its braking position to cause the pedal to assume its non-skiing position and each lever to assume its braking position. Guide surfaces are provided on the underside of the pedal for engaging and urging inward the upper arms of each lever. These guide surfaces act as a positioning means for holding each of the lower arms in an inboard position when each of the levers is in its non-braking position.

In its preferred embodiments the ski brake also has a second spring for urging each of the lower arms into an outboard position when each lever is in the non-braking position.

In its preferred embodiments the ski brake is used in connection with a turntable ski binding. The turntable has an opening for receiving the pedal of the ski brake and the turntable supports the sole of the ski boot when the pedal is pushed into the skiing position by the ski boot.

A preferred embodiment of the ski brake also has a protrusion extending from the rear of the pedal which selectively engages the heel retainer of the turntable ski binding thereby inhibiting movement of the sole retainer.

In its preferred embodiments the levers are made from round wire and the thickness of the pedal is about the thickness of the levers.

BRIEF DESCRIPTION OF THE DRAWINGS

FIG. 1 is a sectional side elevational view of a ski brake according to the invention.

FIG. 2 is a top plan view, partially in section, of the ski brake of FIG. 1.

DESCRIPTION OF THE PREFERRED EMBODIMENTS

Figure 3:
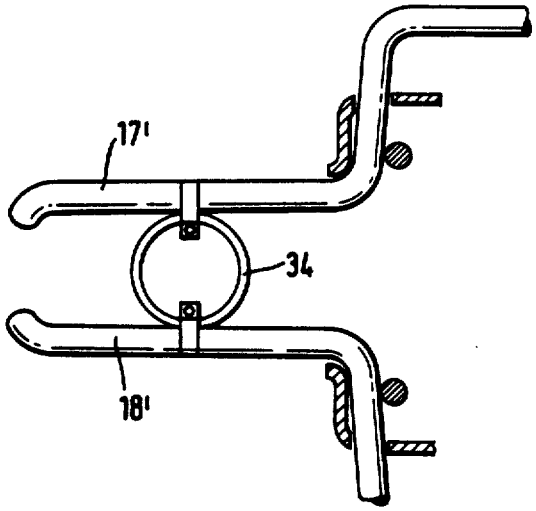
FIGS. 3, 4, and 5 are partial top plan views of additional embodiments of the invention.

In the embodiments shown in the drawings, ski brakes according to the invention are shown in use with a so-called turntable ski binding. Such turntable bindings are already known in the art and are further described in U.S. Pat. No. 4,035,001 (titled Heel Tightener for Safety Ski Bindings issued July 12, 1977 with Roland Jungkind as inventor and Hannes Marker as assignee) which is incorporated herein by reference. FIGS. 1 and 2 hereof show portions of the turntable binding. A turntable 1 is held onto the top of a ski 3 by means of a holding disc 2 which is itself fixed to the ski by means of a set of screws 4, only one of which is shown. Turntable 1 has some limited horizontal swivel motion in each direction. Turntable 1 has two upwardly flanged side walls or cheeks 5, 6. A pair of tension bars 7, 8 (shown only in part) are rotatably mounted in holes in side walls 5, 6. The other ends (not shown) of tension bars, 7, 8 carry a sole retainer (not shown) which is movable against the force of at least one spring and engages the heel of the ski boot. Thus, during skiing, the sole retainer holds the ski boot to the ski. However, when it is desirable to release the ski boot, such as during a fall, the ski boot and turntable are permitted to rotate somewhat, thereby facilitating release of the ski boot.

Turning now to a ski brake according to this invention, FIG. 1 shows a bridging member 9 formed on the rear of holding disc 2 which bridges the rear portion of turntable 1. A ski brake base plate 10 is attached to the ski adjacent to the rearward edge of bridging member 9. Ski brake base plate 10 has upwardly flanged walls 11 which support a cross axle 12 for rotational movement. One end of an actuating arm 13 is attached to axle 12 and is thereby rotatably mounted to base plate 10. The other end of actuating arm 13 is rotatably mounted near the rear of pedal 14 by means of a bolt 15 which is received for slidable movement in a slot 16 formed in pedal 14. Actuating arm 13 can rotate around bolt 15. In addition, actuating arm 13 can slide somewhat along pedal 14 when bolt 15 slides in slot 16.

The ski brake further comprises lever means in the form of a pair of levers 17, 18 rotatably attached to the forward portion of pedal 14. The construction of each lever is better understood by examining FIG. 2, which is in partial section, with half of the top of pedal 14 having been removed. Preferably, levers 17, 18 are each formed from a piece of round wire. As best seen in lever 17, each lever has a central connecting portion 21 between a lower arm 19 and an upper arm 22. Lower arm 19, which is the free end, has a plastic covering 20 and forms the brake prong and acts to engage the snow by extending below the ski when the ski brake is in the braking position as in FIG. 1. Central connecting portion 21 acts as a pivot shaft between lower arm 19 and upper arm 22. Thus, if upper arm 22 is pulled up, then lower arm 19 is rotated down into the braking position below the ski. When upper arm 22 is pushed down, lower arm 19 is rotated up into its non-braking position wherein it does not extend below the ski.

A coiled spring 26 is provided on cross axle 12. The middle of spring 26 has an activating leg 27 for engaging actuating arm 13. Each end of spring 26 has base legs 28 for engaging base plate 10. Spring 26 acts as a means for biasing the actuating arm into the upward actuating position shown in FIG. 1. The upwardly flanged walls 11 of base plate 10 are covered by a lid 29 which is fastened to base plate 10 by rivets 30. Rivets 30 together with lid 29 and upwardly flanged walls 11 form the bed for pivot shaft 21 of levers 17, 18.

As can best be seen in the upper portion of FIG. 2, there are guide surfaces 25 formed on the underside of pedal 14. These guide surfaces 25 are structured to engage upper arms 22 of levers 17, 18 when pedal 14 is pushed down. The lower portion of each guide surface is closer to the side of the ski than the upper portion. Thus, when the guide surface 25 first engages an upper arm 22 of a lever, the lever is away from the midline of the ski; however, as pedal 14 is pushed down further, guide surface 25 urges upper arm 22 inward toward the middle of ski and the lever is brought inward.

The operation of these various parts of the ski brake can be better understood by considering how the ski brake moves between its braking and skiing positions. FIG. 1 shows the ski brake in its braking position; which means that lower arm 19 extends below the bottom of ski 3. When the ski boot is inserted into the binding, the back of the sole engages pedal 14. As pedal 14 is pushed down, levers 17, 18 are rotated about the respective pivot shafts 21 until lower lever arms 19 are raised above the ski and about parallel to it. This rotation is done against the force of spring 26 which biases actuating arm 13 toward the actuating position shown in FIG. 1. As pedal 14 is pushed further down bolt 15 slides forward in slot 16. This further pushing down of pedal 14 causes actuating arm 13 to stretch spring 26 further, but because of the leverage provided by the pedal and actuating arm, the additional force required is relatively small.

Pushing down of pedal 14 causes upper arms 19 of the levers to engage guide surfaces 25 on the underside of the pedal. This forces levers 17, 18 inwardly toward each other so that the position (shown in the top half of FIG. 2 for lever 17) in which lower arm 19, for the most part at least, is inside the width of the ski. Thus, the danger is lessened that lever from the other ski will hook up with one of the levers from this ski. In other words, it can be said that, in the braking position, lower arm 19 is outboard from the ski, which means that it extends past the side of the ski; but when in the non-braking position lower arm 19 is inboard of the ski, which means that, for the most part, it is at or within the side of the ski. It should be understood that the term inboard as used herein also contemplates the possibility of some portion of lower arm 19 extending outwardly beyond the side of the ski, as shown at the top of FIG. 2. What is important about the inboard position is that the free end of lower arm 19 be brought to the side of the ski so as to minimize the danger inherent in having the brake stick out during skiing.

When pedal 14 is released, the ski brake is urged into the braking position because spring 26 urges actuating arm upwards, which in turn pulls pedal 14, which in turn pulls on upper arm 22 and rotates lower arm 19 down into the braking position.

Further refinements of the invention are also shown in the drawings.

The end of upper arm 22 of each lever is bent inward toward the middle of the ski and reduced in diameter to form an attachment prong 23. A spring 24 is mounted between the two levers 17, 18 and held in place by the attachment prongs on the end of each upper arm. Spring 24 urges levers 17, 18 apart. Thus, spring 24 acts as a biasing means for urging levers 17, 18 apart, so that when the levers assume their braking position, each lower arm 19 is urged outboard of the ski.

Turntable 1 further comprises a metal supporting piece 31 and plastic boot plate 32. This plastic boot plate extends in a horseshoe shape around holding disc 2. The open side of horseshoe-shaped plastic boot plate 32 is towards the back of the ski so that an open area is provided for receiving pedal 14 above holding disc 2. As the ski boot pushes pedal 14 down, pedal 14 is received within the opening of horseshoe-shaped boot plate 32. When pedal 14 is pushed all the way down, the ski boot engages boot plate 32. Preferably, boot plate 32, rather than pedal 14, carries the weight of the boot during skiing. Thus, the friction between the boot and pedal 14 is kept to a minimum when the turntable is in motion, such as during a fall.

The rear of pedal 14 extends beyond actuating arm 13. This extension 33 serves the purpose of engaging the sole retainer (not shown) of the ski binding. In this manner the ski binding is prevented from swiveling when it is placed in the position shown in FIG. 1. The manner of such engagement is known in the art, as shown for example in U.S. Pat. No. 4,366,968 where a turntable type ski binding has a pedal with locking arm for engaging a sole retainer to prevent the retainer from swiveling. This is desirable when, for example, transporting the skis.

The outside diameter of spring 24 is no larger than the wire diameter of levers 17, 18. Since neither pedal 14 nor part 32 needs to be enlarged to accommodate spring 24, the size of pedal 14 and therewith the size of plastic part 32 of turntable 1 can be kept small. Thus, the heel of the ski boot is not required to project very far above the top of the ski.

Figure 4:
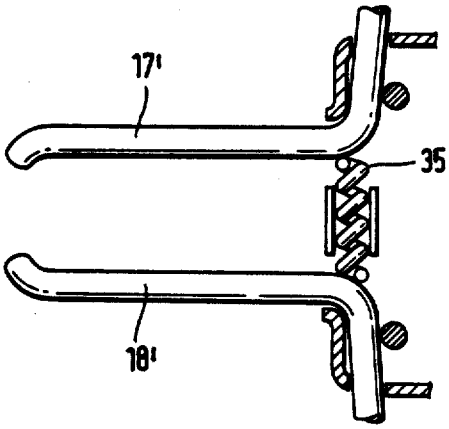
Figure 5:
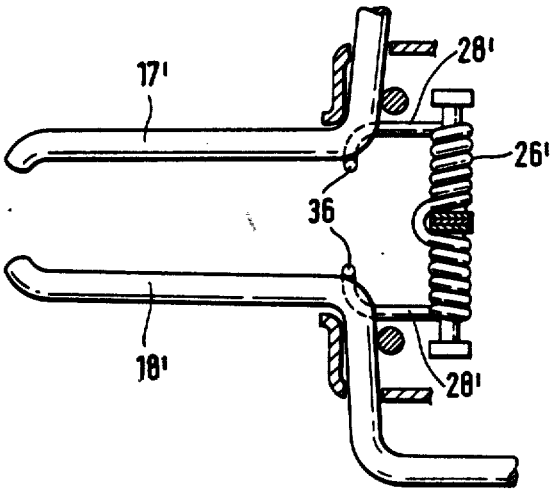

FIGS. 3, 4 and 5 show alternate placements of the biasing means used between lever means 17, 18.

In the embodiment of FIG. 3, a spring 34 constructed in the form of a closed ring is clamped to lever means 17', 18'.

In the embodiment of FIG. 4, a coiled spring 35 is mounted on the base plate between lever means 17', 18'.

The embodiment of FIG. 5 eliminates the use of two springs (such as springs 24 and 26 in FIGS. 1 and 2) by instead using a single coiled spring 26'. Base legs 28' of spring 26' work in the same way as base legs 28 of spring 26 in FIGS. 1 and 2, but, in addition, they also have turned up ends 36 for engaging lever means 17', 18'. Thus, in this embodiment, spring 26' has the dual function of not only acting as the biasing means for urging actuating arm 13 into its actuating position, but also acting as the biasing means for urging levers 17, 18 into outboard positions when the braking position is assumed.

The invention has been described in detail with particular emphasis on the preferred embodiments, but it should be understood that there are other additional variations and modifications within the scope and spirit of the invention.

What is claimed is:

1. A brake for a ski, comprising:

a pair of laterally spaced wire levers, each wire lever being of predetermined diameter and comprising a pivot shaft intermediate a lower arm and an upper arm, said lever being rotatable between a braking position in which said lower arm extends below the ski and outboard from the ski and a non-braking position in which said lower arm does not extend below the ski;

a coil spring disposed between said wire levers for biasing said lower arms outboard from the ski, said coil spring having a diameter no larger than the diameter of either of said levers;

actuating means for urging each lever into said braking position;

a generally circular pedal being rotatable about an axis perpendicular to said pedal and having a thickness about equal to the predetermined diameter of said wire levers, said pedal further having a downwardly facing recess containing the coil spring and receiving the upper arms of each of said wire levers, said pedal receiving pressure from the sole of a ski boot, said pedal being movable by the pressure of the ski boot from a non-skiing position to a skiing position, said levers being rotated into said non-braking position when said pedal means is moved into said skiing position; and positioning means for holding each of said lower arms in an inboard position against the bias of said coil spring when said levers are in said non-braking position, said positioning means comprising a guide surface on said pedal for engaging and urging inward said upper arms when said pedal is in said skiing position.

2. The ski brake of claim 1, wherein said actuating means comprises:

an actuating arm operatively connected to each of said levers and movable between an actuating position wherein said levers are in said braking position and a non-actuating position wherein said levers are is in said non-braking position; and first biasing *means* for biasing said actuating arm to said actuating position to cause said levers to assume said braking position; and wherein said pedal is operatively connected to said actuating arm, said actuating arm being moved to said non-actuating position when said pedal is moved into said non-skiing position.

3. The ski brake of claim 1 wherein said actuating means comprises an actuating arm operatively connected to each of said levers and movable between an actuating position wherein said levers are in said braking position and a non-actuating position wherein said levers are in said non-braking position; and first biasing means for biasing said actuating arm to said actuating position to cause said levers to assume said braking position [; and wherein said spring and said first biasing means comprise a single spring].

4. The ski brake of claim 1 and further comprising:

a turntable ski binding with a turntable having an opening for receiving said pedal when said pedal is in said skiing position, said turntable being engageable by the sole of a ski boot when said pedal is moved into said skiing position by said pressure of said ski boot.

5. The ski brake of claim 4, wherein said turntable further comprises a horseshoe-shaped boot plate for bearing weight of said ski boot when said pedal is in said skiing position.

* * * * *